United States Patent Office 3,839,504
Patented Oct. 1, 1974

3,839,504
REACTION OF PHOSPHORUS TRIHALIDES WITH PENTAERYTHRITOL AND POLYMERIC PHOSPHITE PRODUCTS THEREOF
Keith A. Hughes and Ronald N. Redline, Waterbury, Conn., assignors to Uniroyal, Inc., New York, N.Y.
No Drawing. Filed Aug. 4, 1971, Ser. No. 169,053
Int. Cl. C07f 9/08
U.S. Cl. 260—921
12 Claims

ABSTRACT OF THE DISCLOSURE

A class of polymeric organic phosphites formed by the reaction of phosphorus trihalide with pentaerythritol at molar ratios of from 0.5 to 1.25:1 said organic phosphite polymer being a liquid at standard conditions and which polymer contains between 2% and 43% by weight halogen and possesses an average hydroxyl number of 20–1000.

BACKGROUND OF THE INVENTION

1. Field of the Invention

The invention relates to a novel class of polymeric phosphites which are formed by the reaction of phosphorus trihalide with pentaerythritol in molar ratios of from 0.5 to 1.25:1. The polymeric phosphites are useful flame retardants and can be reacted with polyurethane systems or blended with other polymeric matrices to provide flame resistance thereto.

2. Description of the Prior Art

U.S. Pat. 3,192,243 discloses a class of compounds based on the reaction product of pentaerythritol and phosphorous trihalides in molar ratios ranging from 1:1.5 to 1:6. The resultant products are crystalline solids with melting points greater than 205° C. and a halogen content of less than 2%.

The present invention is distinguishable from the cited prior art in the following respect:

1. The molar ratios of pentaerythritol to phosphorus trihalide are different than the stated ratios in the patent.
2. The formation of the compounds in the reference is dependent upon rapid removal of hydrogen halide during the reaction of the phosphorus trihalide with pentaerythritol. According to the reference the rapid removal of hydrogen halide is necessary to keep the halogen content of the compounds at a minimum. In the present invention, the presence of hydrogen halide in the reaction mixtures is essential in order to prepare compounds having halogen contents of greater than 2% by weight.
3. The compounds claimed in said patent do not possess free aliphatic hydroxyl groups, whereas the compounds in the present invention possess free aliphatic hydroxyl groups which form an integral part of these compounds.

U.S. Pat. 3,210,398 discloses a series of compounds derived from an intermediate compound which is prepared by reacting pentaerythritol and phosphorus trichloride at a molar ratio of 1:2. The examples state that this intermediate is a crystalline solid melting at 121–123° C.

The present invention is distinguishable from this reference because:

1. The molar ratios of the present invention are not within in the ratio limits of the reference patent;
2. The compounds of the present invention contain free hydroxyl groups, whereas, the compounds in the reference do not; and
3. The compounds of the present invention are viscous liquids as opposed to a crystalline solid as stated in the prior art reference.

U.S. Pat. 3,192,242 discloses a class of compounds based upon the reaction of a halogen with an intermediate compound which is obtainable by the reaction of pentaerythritol with phosphorus trihalide at a molar ratio of 1:2. The reference discloses a side reaction of the pentaerythritol with phosphorus trichloride, but the product depicted is clearly a reaction product of a 1:2 molar ratio. A 1:2 molar ratio is outside of the molar ratio used in the present invention.

U.S. Pats. 3,159,602; 3,364,285; 3,169,863 and 3,090,799 utilize the reaction product of pentaerythritol with phosphoryl chloride or phosphorus oxychloride as intermediate for plasticizers, photographic emulsion sensisitizers or flame resistant polymers.

The present invention differs from the four patents mentioned above in the following respects:

1. The reactants in the present invention are clearly defined to be phosphorus trihalides are not phosphorus oxychloride or phosphoryl chloride.
2. The products of the instant invention contain free hydroxyl groups that are available as reactive sites for formation of polyurethanes and polyesters. The intermediate of the above cited prior art contain no such hydroxyl groups.

SUMMARY OF THE INVENTION

The invention relates to a novel class of phosphite polymers which are formed by the fraction of a phosphorus trihalide [$PX_3$ (where X is chlorine, bromine or iodine)] with pentaerythritol [$C(CH_2OH_4)$]. It is essential that the molar ratio of reactants (phosphorus trihalide to pentaerythritol) be within the range of 0.5:1 to 1.25:1. The products resulting from such reaction are viscous liquids containing phosphorus, halogens and free hydroxyl groups, possess between 2% and 43% (by weight) halogen and have an average hydroxyl number between 20 and 1,000.

In order for a flame retardant to be effective, it generally must contain one and preferably both of the following elements: a halogen and/or phosphorus, a charring agent. Previously, most commercial flame retardants were nothing more than highly halogenated phosphites or phosphates which were physically blended with a polymer or other matrix. Recently, manufacturers have come to realize the necessity of having flame retardants that coreact with the substrate. These reactive type flame retardants represent an integral part of the polymeric structure and do not signicantly modify the physical properties of said polymer. It has been found also that reactive type flame retardants exhibit very little loss of activity during heat aging while additive types generally destroy the natural heat stability of the substrate leaving it very vulnerable to burning. The compounds of the present invention possess the commercially desirable properties noted above.

In particular the compounds possess free hydroxyl groups available for reaction with isocyanates for the production of polyurethanes.

DESCRIPTION OF THE PREFERRED EMBODIMENTS

The polymeric phosphites of the present invention are prepared by reacting pentaerythritol with a phosphorus trihalide at the ratios of 1.0 mole of pentaerythritol to from 0.5 mole to 1.25 moles of phosphorus trihalide. Suitable phosphorus trihalides are phosphorus tribromide, phosphorus trichloride and phosphorus triiodide, preferably phosphorus tribromide. These ratios are calculated to give products containing specific amounts of free hydroxy groups. The preferred reaction in the present invention is 1.0 mole of pentaerythritol to 1.0 mole of phosphorus tribromide.

The products of the present invention are formed by reacting pentaerythritol and phosphorus trihalide at the molar ratios indicated above to form trialkyl phosphites. Structures A through C represent some of the possible phosphites formed, although these structures are not inclusive and many variations are possible. Structure A represents a monomeric phosphite, while B and C represent polymeric phosphites:

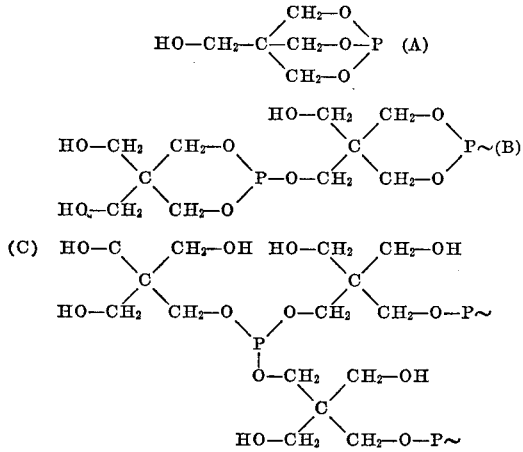

During the reaction, a large amount of hydrogen halide gas is evolved (3 moles of hydrogen halide for each mole of phosphorus trihalide). Although a substantial amount of this gas is lost to the atmosphere, enough of it is retained in the reaction mixture to react with the trialkyl phosphites. This reaction is known as the Arbuzov rearrangement, and is illustrated in the equations which follow wherein A and B are trialkyl phosphites, and X is a halogen selected from the group consisting of chlorine, bromine and iodine.

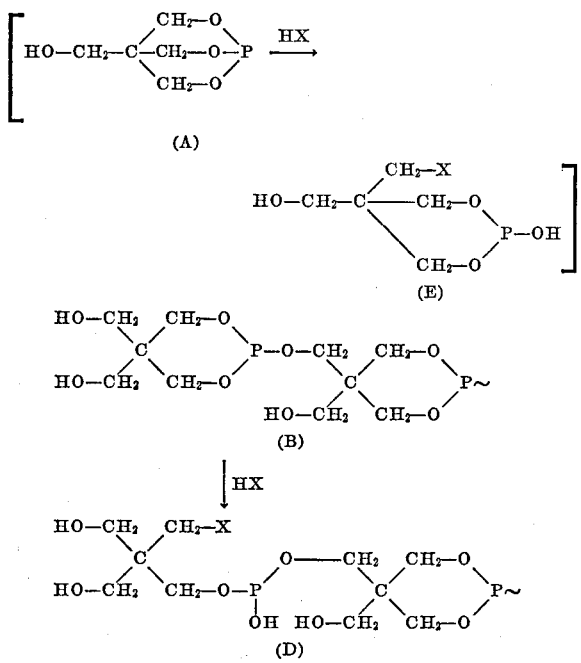

In essence, the trialkyl phosphites, A and B noted above, are converted to dialkyl phosphites by incorporation of a mole of hydrogen halide therein. Structures D and E are representative of the final products of the present invention although these are noted by way of illustration and do not represent the only possible structures.

The rate of conversion of trialkyl phosphite to dialkyl phosphite depends upon the phosphorous trihalide used. Hydrogen chloride formed during the reaction of pentaerythritol and phosphorus trichloride is not as reactive as hydrogen bromide formed from the reaction of pentaerythritol and phosphorous tribromide. When phosphorus trichloride is used, as one of the reactants, the product may contain from 2 to 18% chlorine, indicating up to a 100% rearrangement of trialkyl phosphite to dialkyl phosphite. Rearrangements beyond 50% are difficult to achieve with the chlorine-containing compound. When phosphorus tribromide is used as one of the reactants a product containing up to 43% bromine content may be obtained, indicating up to 100% rearrangement. Once the dialkyl phosphite is formed, no further reaction occurs because said dialkyl phosphite is essentially unreactive with hydrogen halides. Further evidence that the rearrangement has occurred is the appearance of a sharp band at 4.2 microns in the infrared spectrum of the product. This band is a characteristic band of dialkyl phosphites and is not present in the spectrum of a trialkyl phosphite.

Another feature of the present invention is that the final reaction product may contain a mixture of said halides. In this situation, it is preferred that the majority of halogen substitution in the polymer of the present invention be bromine.

One aspect of this invention noted above is that the compounds are viscous liquid products instead of solid products as taught in the prior art. Due to the ease of mixing, the use of a liquid product has a distinct advantage when working with the viscous polyols for making polyurethanes. It is in this respect, therefore, that the molar ratios of pentaerythritol to phosphorus trihalide are critical. At less than 0.5 mole of phosphorus trihalide per mole of pentaerythritol, the resultant reaction product is low melting solid. At more than 1.25 moles of phosphorus trihalide per mole of pentaerythritol solid materials are formed. It is in the range of 0.5 to 1.25 moles of phosphorus trihalide per mole of pentaerythritol that the compounds are viscous liquids containing the desired combinations of hydroxyl groups, halogen and phosphorus.

The general method of producing the phosphite polymer is initially to prepare a slurry of pentaerythritol in a suitable solvent. Preferred solvents used for the reactions are monochlorobenzene and xylene, although many other suitable solvents non-reactive with phosphorus trihalide can be used. A suitable amount of phosphorus trihalide within the range noted above is then added to the slurry while agitating same. The addition temperature may range from 5° C. to 120° C., preferably 25° C., however at temperatures above 50° C. the rate of addition of the phosphorus trihalide to pentaerythritol must be slowed to prevent undue loss of phosphorus trihalide with the hydrogen halide evolved. Evolution of hydrogen halide gas becomes moderate to strong during the reaction, but no attempt is made to remove it from the reaction mixture as it is formed. This is to permit the reaction of the hydrogen halide entrained in the reaction mixture with the phosphite formed.

In instances where less than 100% conversion of the trialkyl phosphite to the halogen-containing dialkyl phosphite is obtained, addition of a more reactive hydrogen halide results in up to 100% conversion (based upon convertible trialkyl phosphite). For example, when phosphorus trichloride is reacted with pentaerythritol in accordance with the present invention and the evolution of hydrogen chloride substantially ceases, hydrogen bromide can then be added to the reaction mixture under the same conditions to result in up to 100% conversion of the trialkyl phosphite.

The halogen content of the product of the present invention may be further increased above the aforesaid 100% conversion based upon the Arbuzov rearrangement, by reacting additional hydrogen halide with the hydroxyl groups contained in the reaction product. However, polymers having a hydroxyl number less than 20 are not considered as being within the scope of this invention.

The phosphite polymers described herein are suitable for reacting with a polyisocyanate to produce a urethane polymer. The polyurethanes are formed in accordance with the methods and using the reactants disclosed in U.S. Pats. 3,194,793; 3,493,525; 3,297,597; 3,251,787; 3,251,788, 3,012,283, and Belgian 724,052 with the exception that from 1 to 35% by weight of the polyol reactants disclosed therein is replaced by the novel polymeric phosphites of the present invention.

In addition the phosphite polymer can be blended with a polyester resin formed from (a) Either saturated or unsaturated dibasic acid components such as phthalic anhydride, adipic acid, azelaic acid, maleic anhydride, fumaric acid and sebacic acid, etc. and (b) Dihydric alcohols such as ethylene glycol, propylene glycol, diethylene, glycol, and butylene glycols, prior to curing with a suitable free radical initiator such as benzoyl peroxide.

The polyester may also contain unsaturated monomers such as styrene, vinyl toluene, dialkyl phthalate, methyl methacrylate and trialkyl cyanurate.

The phosphite polymers are added to said polyesters or other thermoplastic matrix polymers such as polyvinyl chloride, ABS type polymers, etc., in an amount of between about 1 and 20 parts, preferably 5 and 10 parts of phosphite per 100 parts of matrix polymer.

The following examples are included to illustrate the invention:

EXAMPLE 1

The reaction of pentaerythritol with phosphorus trichloride (1:1)

A slurry of 136.0 grams (1.0 mole) pentaerythritol (technical grade containing about 11-15% dipentaerythritol) in 250 ml. xylene (B.P. 138.7-140.1 C.) was prepared. To this stirred slurry 137.5 grams (1.0 mole) of phosphorus trichloride was added in 30 minutes. The temperature rose from 27° C. (room temperature) to 30° C. The mixture was stirred for one hour at 30° C. The temperature was then raised to 100° C. over a 2-hour period. Evolution of hydrogen chloride gas was moderate to strong during the first 2 hours of reaction and ceased completely during the third hour. The mixture was brought to 141° C. and refluxed for 2 hours. The xylene was distilled under reduced pressure. The final pot temperature was 150° C. at 40 mm. pressure. The product was a cloudy off-white liquid which is free flowing at 100° C. and highly viscous at room temperature. The product weight was 164.0 grams.

Analytical values:

Percent chloride _____ 4.9
Percent phosphorus _____ 17.4

EXAMPLE 2

The reaction of pentaerythritol with phosphrous trichloride 1:1.2)

At room temperature 165.0 grams (1.2 moles) of phosphorus trichloride was added over a 30 minute period to a stirred slurry of 136.0 grams (1.0 mole) of technical grade pentaerythritol in 250 ml. xylene. The temperature reached 30° C. during the addition. The mixture was stirred for one hour at 30° C., and then slowly heated to 100° C. in 2 hours. Evolution of hydrogen chloride gas was moderate to strong during the first 2 hours, and ceased during the third hour of reaction. The mixture was heated to reflux (141° C.) and refluxed two hours. The xylene was distilled at reduced pressure. The final pot temperature was 150° C. at 40 mm. pressure. The product was 164.0 grams of a cloudy off-white liquid, freely flowing at 100° C. and highly viscous at room temperature.

Analytical values:

Percent chlorine _____ 4.33
Percent phosphorus _____ 15.9
Hydroxyl number _____ 232.1

EXAMPLE 3

The reaction of pentaerythritol with phosphorus tribromide (1:1)

At room temperature (27° C.), 270.8 grams (1.0 mole) of phosphorus tribromide was added in 30 minutes to a stirred slurry of 136.0 grams (1.0 mole) of technical grade pentaerythritol in 250 ml. xylene. The mixture was slowly heated to 90° C. in one hour and held at 90° C. for three hours. Evolution of hydrogen bromide gas began at 90° C. and was strong for the first two hours. Gas evolution ceased during the third hour at 90° C. The mixture was heated to reflux (141° C.) and refluxed for two hours. The xylene was distilled at reduced pressure. The final pot temperature was 150° C. at 40 mm. pressure. A cloudy liquid with a reddish tint weighing 282 grams was collected. The product is fluid at 100° C. and highly viscous at room temperature.

Analytical values:

Percent bromide _____ 42.35, 42.65
Percent phosphorus _____ 10.9
Hydroxyl number _____ 130.6

EXAMPLE 4

The reaction of pentaerythritol with phosphorus trichloride (1:1.2)

A slurry of 136.0 grams (1.0 mole) of technical grade pentaerythritol in 250 ml. xylene was heated to 115° C. While maintaining the temperature at 115° C., 165.0 grams (1.2 moles) of phosphorus trichloride was added dropwise in two hours. When the addition was completed, the mixture was heated to 141° C. and refluxed for two hours. The xylene was distilled at reduced pressure (40 mm.). The pot temperature reached a maximum of 155° C. A cloudy off-white liquid weighing 185 grams was collected. The liquid was free-flowing at 100° C. and highly viscous at room temperature.

Analytical values:

Percent chlorine _____ 14.8
Percent phosphorus _____ 18.7
Hydroxyl number _____ 218

EXAMPLE 5

This example demonstrates the usefulness of the compounds of this invention as flame retardants in polyurethane foam. Below are the formulations used to test these compounds. In each case 15 percent by weight of the polyols was replaced by the amount of flame retardant.

A—RIGID FORMULATION

Grams

Polypropoxylated amnioethylpiperazine having a hydroxyl number of 520 _____ 55
Polypropoxylated sorbitol having a hydroxyl number of 490 _____ 30
Silicone surfactant _____ 1
Trichlorofluoro methane _____ 45
Reactive flame retardant _____ 15
Diphenyl methane-based diisocyanate (MDI) _____ (¹)

¹ Amount dependent upon hydroxyl equivalents of polyols.

B—FLEXIBLE FORMULATION

Grams

Polypropoxylated glycerine having a hydroxyl number of 25 _____ 85
Barium sulfate—inert filler _____ 100
Stannous octoate catalyst _____ 1.5
1,4-diazo dicyclooctane catalyst _____ .35
Silicone surfactant _____ 1.0
Reactive flame retardant _____ 15
Mixed tolylene diisocyanates _____ (¹)

¹ Amount dependent upon hydroxyl number of polyols.

The samples were formulated and hand mixed using an Eppenback Spindle Stirrer. The material was then transferred to 8 x 8 x 4 inch cake boxes and allowed to rise. In the case of rigid foams, there was no need of further curing. Flexible foams require a cure cycle usually 10 min. at 100° C. The foam samples were then cut to desired shapes and subjected to a series of flame tests. The preliminary screening tests were ASTM–D–1692–59T and the Bureau of Mines Flame Penetration test. ASTM–D–1692–59T is a horizontal flame test that utilizes a simple Bunsen burner equipped with a wing tip and wire gauze supported by a ring stand. Each 6 x 2 x ½ inch sample is marked with a line across its width at one inch and 5 inches along the length. Each sample is then subjected to a flame for one minute at one end; and then the flame is removed. At that point the interval needed for the flame to extinguish is recorded. From this test, two ratings are obtained, a classification of burning ease and also a burning rate. The three burning classifications are non-burning, self-extinguishing, and burning. The non-burning rating is given to those samples whose one-inch mark was not reached by the flame front in the one minute ignition time. The burning rating is given to those samples that burned past the 5-inch length. The self-extinguishing rating is given to those samples that burn past the one-inch mark, but extinguish before reaching the 5-inch mark. The burning rate is obtained by dividing the length burned between the one-inch and five-inch mark by the elapsed time.

The Bureau of Mines Penetration test measures the length of time it takes a propane torch with a flame temperature of 1910°–1950° F. to burn through the thickness of a 6" x 6" x 1" sample supported vertically facing the flame front. Tables 1 and II below list the findings of these tests.

TABLE I

Rigid Formulation

| Flame retardant | ASTM rating | Bureau of Mines Penetration test |
|---|---|---|
| Control which includes reaction product of pentaerythritol and PCl₃ (1:1) as in Example 1. | Non-burning | 2 min. 5 secs. |
| Control ¹ | Self-extinguishing, 4.8 in./minute. | 59 seconds. |

Flexible Formulation

| Flame retardant | ASTM rating |
|---|---|
| Control which includes reaction product of pentaerythritol and PCl₃ (1:0) as in Example 1. | Burning, 1.2 in./minute |
| Control ¹ | Burning, 5.4 in./minute |

¹ Contains no phosphite polymer.

TABLE II

Rigid Formulation

| Flame retardant | ASTM rating | Bureau of Mines Penetration test |
|---|---|---|
| Control which includes reaction product of pentaerythritol and PCl₃ (1:1.2) as in Example 2. | Non-burning | 2 min. 5 secs. |
| Control ¹ | Self-extinguishing, 15 seconds. | 1 min. 15 secs. |

Flexible Formulation

| | ASTM rating |
|---|---|
| Control plus reaction product of pentaerythritol and PCl₃ (1:1.2) as in Example 2. | Burning, 3.1 in./min. |
| Control ¹ | Burning, 8.4 in./min. |

¹ Contains no phosphite polymer.

In similar tests using phosphite polymers prepared using various reactant ratios the flame resistance of the resultant foam sample is greatly enhanced.

EXAMPLE 6

This example illustrates the usefulness of the compounds of this invention as flame retardants in a polyester resin system. Into 200 grams of standard resin, based on maleic anhydride, phthalic anhydride, and propane 1,2 diol, 30 grams of the reaction product of $PBr_3$ and pentaerythritol (1:1) described in Example 3 and 2 grams of benzoyl peroxide were added. The above resin was cured for 24 hours in a plate mold at an oven temperature of 150° F. The resultant material was then cut to desired shapes and tested for flame resistance. Because the resultant material is not a cellular product, two screening tests that are applicable for solid plastics were used. The two tests were UL Subject 94 and ASTM D–635. UL Subject 94 measures the burning resistance of the sample by recording the length of time it takes for a sample to burn four inches. This measurement is in the form of a burning rate. ASTM D–635 yields two ratings: burning rate and a classification of burning ease. These are the same classifications that exist in ASTM 1692–59T. Tables II and IV below list a summary of the findings.

TABLE III

UL Subject 94 Test

| | Parts per hundred resin | Burning rate |
|---|---|---|
| Control | | .73 in./min. sample totally consumed. |
| Control containing reaction product of $PBr_3$ and pentaerythritol (1:1). | 15 | Flame did not pass one-inch mark. |

TABLE IV

| Formulation | Parts per hundred resin | ASTM D–635 Rating | Rate |
|---|---|---|---|
| Control | | Burning | .94 in./min. |
| Control containing reaction product of pentaerythritol and $PBr_3$ (1:1). | 15 | Self-extinguishing. | Flame front did not advance past one-inch mark. |

EXAMPLE 7

This example illustrates the usefulness of the compounds of this invention as light stabilizers for polypropylene. To 400 gm. of Profax 6501 we add 1.6 gm. of Dilaurylthiodipropionate, varied concentrations of commercial U.V. absorbers, and the compound prepared in Example 1 herein. The stabilized polypropylene was compression molded into 10 mil. films and was exposed to ultraviolet light in an FS/BL exposure unit. Failure was recorded upon embrittlement.

| Formulation | Conc. | Days to embrittlement |
|---|---|---|
| (1) Blank (Profax 6501) | | 5 |
| (2) DLTDP (dilaurylthiodipropionate) | 0.4 | 7 |
| (3) DLTDP/reaction product of pentaerythritol and PCl₃ (1:1) | 0.4/0.5 | 11 |
| (4) DLTDP/reaction product of pentaerythritol and PCl₃ (1:1)/octyl phenyl salicylate | 0.4/0.5/0.5 | 53 |
| (5) DLTDP/octyl phenyl salicylate | 0.5/0.4 | 29 |

EXAMPLE 8

This example illustrates the usefulness of the compounds of this invention as stabilizers for solution SBR. To 100 parts of Solprene 1205, was added 1 pt. of either Polygard, BHT, or a selected compound of this invention. Each of the stabilized samples was mill mixed for 4 minutes and sheeted off at 100 gauge. The sample was then subjected to a hot mill study. For this test, samples of stabilized rubber are milled at 330° F. for a prolonged time interval. At certain times during this interval, small samples are removed from the mill and Mooney viscosities are obtained. Large variations in Mooney viscosity over the prearranged time interval indicate breakdown of the stabilizer promoting excessive crosslinking in the polymer.

| Compound | Conc. | Mooney viscosity vs. time on 330° F. mill | | | | |
|---|---|---|---|---|---|---|
| | | 0 hr. | ¼ hr. | ½ hr. | ¾ hr. | 1 hr. |
| (1) Blank | | 51.5 | 53.0 | 53.0 | 57.0 | 94 |
| (2) Trisnonylphenyl- phosphite | 1 | 51.5 | 51.0 | 50.0 | 51.0 | 47 |
| (3) Butylated hydroxy tulene (BHT) | 1 | 50.0 | 55.0 | 54.0 | 58.0 | 94 |
| (4) Reaction product of pentaerythritol and PCl₃ (1:1) (Example 1) | 1 | 50.0 | 51.0 | 51.0 | 52.0 | 52.0 |

The reaction product of pentaerythritol and $PCl_3$ (1:1) shows a definite advantage over the blank and BHT (commonly used as a stabilizer for Solprene), and it is roughly equivalent to Polygard[R] HR, a phosphite.

EXAMPLE 9

This example illustrates the usefulness of the compounds of this invention as heat stabilizers for polyurethane foam. To the standard rigid formulation mentioned in Example 5, was added sufficient reaction product of pentaerythritol and $PCl_3$ (1:1) to give a 15% by weight concentration in the resultant foam. This stabilized foam was evaluated against a non-stabilized control and two similar rigid foams containing commercial flame retardants. Each of the foam samples was placed in an oven set at 285° F. for 22 hours. Measurements of compressive strength and dimensions were taken before and after heat aging. Large changes in dimensions during heat aging, and negative changes in compressive strength, indicate polymer breakdown.

| Compound | Conc., percent | After heat aging | | |
|---|---|---|---|---|
| | | Percent dimensional change | Percent change compressive strength | Color |
| (1) Blank | | +21.94 | −7.43 | Lt. tan. |
| (2) Tris (2,3-dibromopropyl) phosphate | 15 | −8.28 | −34.3 | Dk. brown. |
| (3) Diethyl N,N-bis (2-hydroxyethyl) aminomethylphosphonate | 15 | +55.1 | −7.6 | Brown. |
| (4) Reaction product of pentaerythritol and PCl₃ (1:1) (Example 1) | 15 | −3.92 | +13.1 | Lt. tan. |

The Reaction product of pentaerythritol and $PCl_3$ (1:1), when used in the above rigid formulation at 15%, gives a heat stable foam that shows little dimensional change and improved compressive strength during aging.

Examples 10 and 11 which follow disclose the addition of a hydrogen halide to the reaction mixture of pentaerythritol and phosphorus trihalide after the evolution of hydrogen halide gas evolved as a result of the Arbuzov rearrangement has ceased. As noted the halide can be the same or different as the halide evolved during the reaction.

EXAMPLE 10

A 3-liter three-neck flash fitted with a stirrer, thermometer and condenser was charged with 272 grams of pentaerythritol (pure) and 500 ml. xylene. The mixture was heated to 90° C. and 275 grams of $PCl_3$ was added slowly over a 2-hour period at a temperature of 85–90° C. When addition was complete, the mixture was heated to 41° C. and refluxed 1 hour. The temperature of the mixture was lowered to 100° C. and HCl was bubbled into the mixture for 1 hour. Temperature kept at 100° C. during addition. The solvent was then stripped. The final pot temperature was 150° C. at 30 mm. Product: 398.5 gm. of a cloudy white viscous liquid.

*Analysis.*—Percent chlorine, 17.62, OH #314. Percent phosphorus, 16.3, Acid #283.

EXAMPLE 11

A 5-liter three-neck flask fitted with a stirrer, condenser and thermometer was charged with 680 grams pentaerythritol (tech. grade) and 1 liter xylene. To this, 687.5 grams $PCl_3$ was added in 20 minutes. The mixture was then heated to 90° C. in 2½ hours then to 141° C. in 2 hours and refluxed for 2 hours.

The mixture was cooled to 100° C. and HBr bubbled into the mixture for 5 hours. The reaction mixture was then refluxed 1 hour at 141° C. and then stripped. Final pot temperature 155° C./20 mm. 1157 grams of a clear white viscous liquid.

*Analysis.*—Percent P, 13.2, OH# 277. Percent Cl, 3.10, 3.13, Acid #188.6. Percent Br, 25.63.

Having thus described my invention, what I claim and desire to protect by Letters Patent is:

1. A method of preparing a liquid organic phosphite polymer comprising reacting at a temperature between 5° C., and 120° C., (a) a compound having the general formula $PX_3$ where P is phosphorus and X is selected from the group consisting of bromine, chlorine or iodine, with (b) pentaerythritol to form phosphite intermediate compounds, the molar ratio of (a) to (b) being from 0.5/1 to 1.25/1 and subsequently reacting the hydrogen halide gas formed during the reaction of (a) and (b) and substantially retained in the reaction vesssel with said phosphite intermediate compounds to form said liquid organic phosphite polymer.

2. The method of claim 1 wherein the hydrogen halide gas is hydrogen chloride.

3. The method of claim 2 wherein hydrogen bromide is added to said reactants after the evolution of hydrogen chloride has substantially ceased.

4. A liquid organic phosphite polymer prepared by the process of claim 1 having a halogen content of between about 2% and 43% by weight and a hydroxyl number of from 20 to 1,000.

5. The phosphite polymer defined in claim 4 wherein the phosphorus trihalide is phosphorus tribromide.

6. The phosphite polymer defined in claim 4 wherein the phosphorus trihalide is phosphorus trichloride.

7. The phosphite polymer defined in claim 5 which contains between 4 and 43% by weight bromine.

8. The phosphite polymer defined in claim 5 which contains between 30 and 43% by weight bromine.

9. The phosphite polymer defined in claim 6 which contains between 2 and 18% by weight chlorine.

10. The phosphite polymer defined in claim 6 which contains between 2 and 5% by weight chlorine.

11. The phosphite polymer defined in claim 4 which contains both bromine and chlorine.

12. The phosphite polymer defined in claim 11 which contains 22–28% by weight bromine and 2–5% by weight chlorine.

References Cited

UNITED STATES PATENTS

| 3,192,242 | 6/1965 | Birum | 260—976 X |
| 3,192,243 | 6/1965 | Birum | 260—976 X |
| 3,210,398 | 10/1965 | Rätz | 260—976 X |

LORRAINE A. WEINBERGER, Primary Examiner

R. I. RAYMOND, Assistant Examiner

U.S. Cl. X.R.

260—77.5 AR, 927 R, 928, 936, 937, 976